United States Patent [19]

Liu

[11] Patent Number: 5,209,550

[45] Date of Patent: May 11, 1993

[54] PISTON-ACTUATED WHEEL COVER

[76] Inventor: Sheng-Kuo Liu, 58, Ma Yuan West St., Taichung, Taiwan

[21] Appl. No.: 753,615

[22] Filed: Aug. 30, 1991

[51] Int. Cl.⁵ .............................................. B60B 7/06
[52] U.S. Cl. ............................... 301/37.1; 301/37.36
[58] Field of Search ............... 301/37 R, 37 P, 37 PB, 301/37 TB, 108 R, 108 A

[56] References Cited

U.S. PATENT DOCUMENTS 3,532,385 10/1970 Foster et al. .................. 301/37 R X
5,011,232 4/1991 Itoh et al. ......................... 301/37 P

FOREIGN PATENT DOCUMENTS 3811794 10/1988 Fed. Rep. of Germany .... 301/37 R
0231201 9/1990 Japan ............................. 301/37 PB Primary Examiner—Russell D. Stormer

[57] ABSTRACT

A wheel cover including a number of fins, a ring engaged in the free ends of the fins, and an expanding device including two tubes communicated with each other and having a piston slidably received in the bore, one end of the ring is engaged with the piston and the other end is engaged with the closed end of one of the tubes, a head is threadedly engaged with the other tube for causing the piston of this tube to move inwards and outwards of the tube, the ring and the fins can be expanded when the head is rotated in one direction.

4 Claims, 4 Drawing Sheets

PISTON-ACTUATED WHEEL COVER

BACKGROUND OF THE INVENTION (a) Field of the Invention

The present invention relates to a wheel cover, and more particularly to a wheel cover for an automotive wheel.

(b) Description of the Prior Art

Typical wheel covers are attached to an automotive wheel by such as force-fitted engagement. In order that the wheel cover will not be separated from the wheel during cycling, the wheel cover should be attached to the wheel as solid as possible. However, it may cause difficulty to remove the wheel cover when, for example, it is required to change the tire.

The present invention has arisen to mitigate and/or obviate the afore-described disadvantages of the conventional wheel covers.

SUMMARY OF THE INVENTION

The primary objective of the present invention is to provide a wheel cover which can be easily attached to a wheel and can be easily removed.

In accordance with one aspect of the present invention, there is provided a wheel cover which includes a body having a number of fins extended axially from a peripheral portion, a slot is formed in the free end of each of the fins, a ring is engaged in the slots of the fins, a notch is formed in the ring, and an expanding device including two tubes having one end integrally formed together, a bore is formed in each of the tubes for containing hydraulic oil and communicated with each other, a piston is slidably received in each of the bores, one end of the ring is engaged with the piston of one of the tubes and the other end of the ring is engaged with the closed end of this tube, an inner thread is formed in the outer end of the other tube, a head is integrally coupled to the piston of the other tube and has an outer thread formed thereon for threadedly engagement with the inner thread of the other tube, the piston of the other tube can be caused to move inwards when the head is rotated so that the end of the ring can be urged to move outward and so that the ring and the fins can be expanded.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
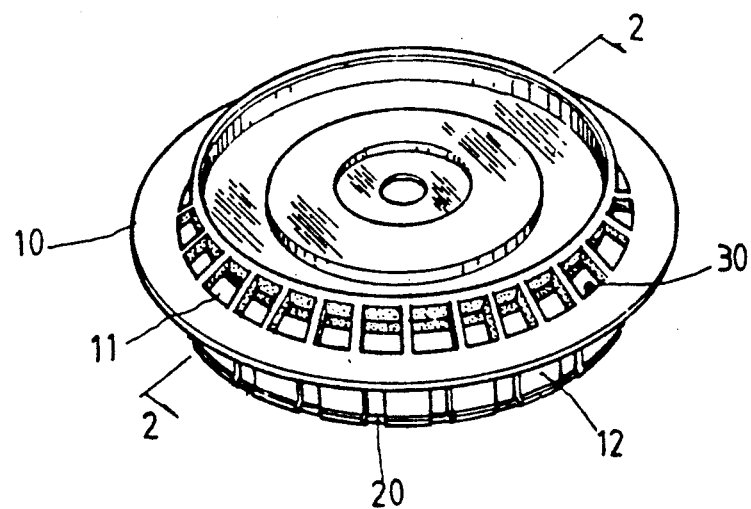
FIG. 1 is a perspective view of a wheel cover in accordance with the present invention.
Figure 2:
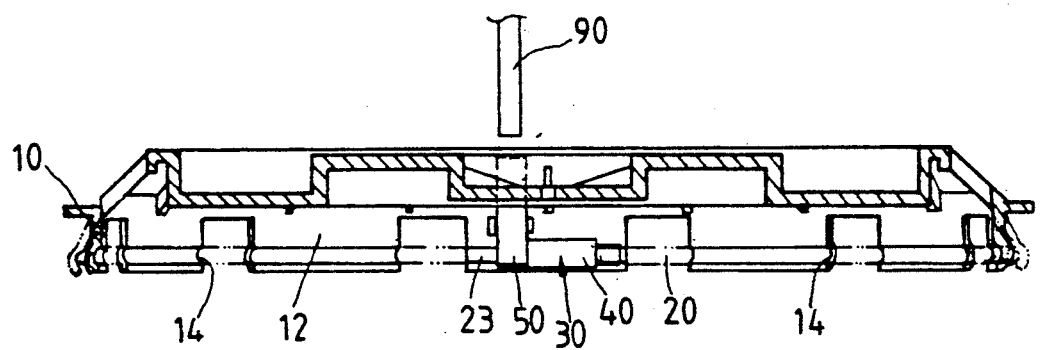
FIG. 2 is a cross sectional view taken along lines 2—2 of FIG. 1.
Figure 3:
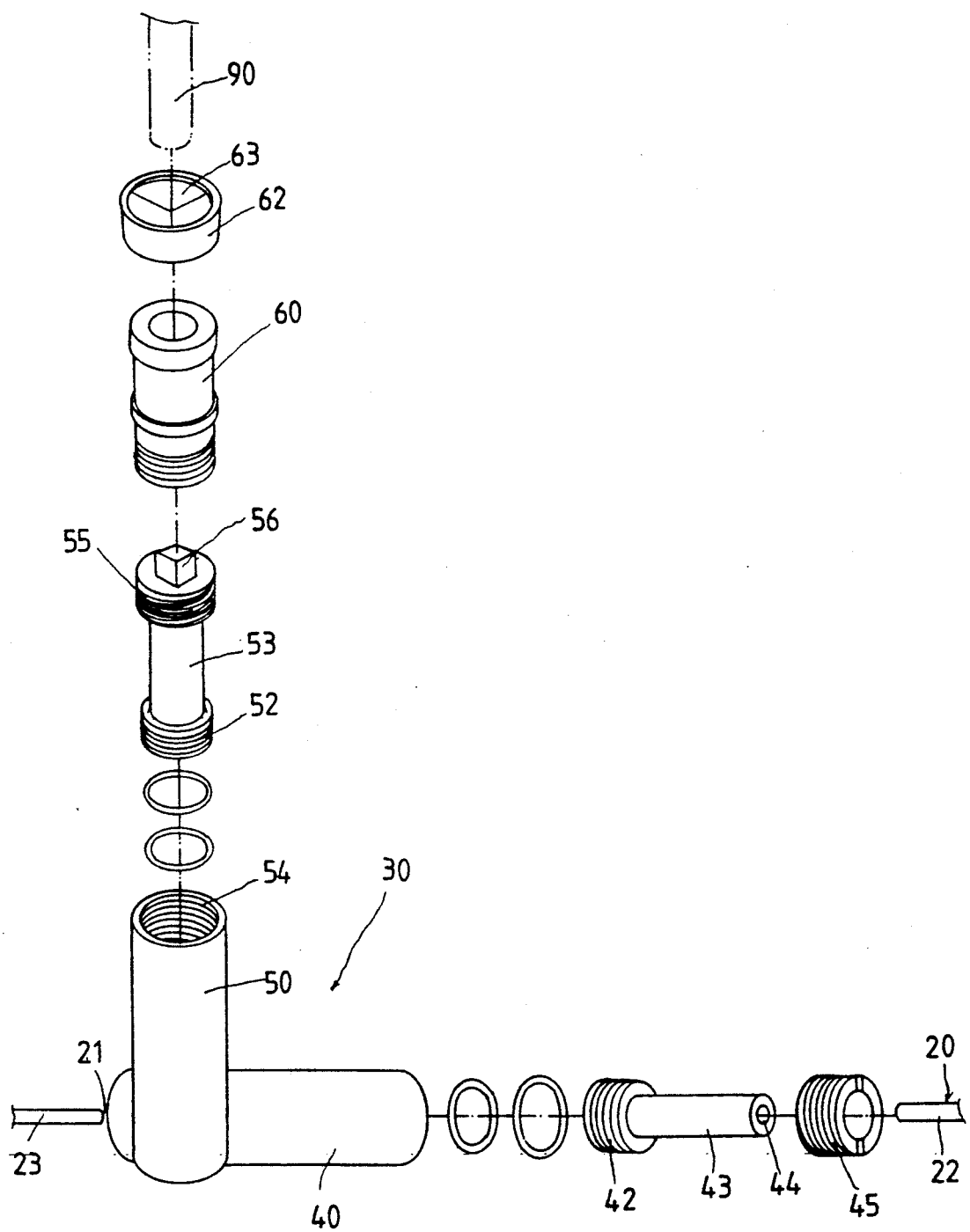
FIG. 3 is an exploded view of an expanding device.

Referring to the drawings and initially to FIGS. 1 and 2, a wheel cover in accordance with the present invention comprises generally a body 10 having a plurality of fins 12 extended axially from a peripheral portion thereof. A plurality of openings 11 which are equally spaced are formed in the peripheral portion of the body 10. A slot 14 is laterally formed in the free end portion of each of the fins 12. The slots 14 of the fins 12 altogether form a circular recess for receiving a ring 20 which has a notch 21 formed therein (FIG. 3). An expanding device 30 is engaged in the notch 21 of the ring 20 for expanding the ring 20, and in turn for expanding the fins 12 so that the wheel cover can be easily attached to a wheel (not shown).

Figure 4:
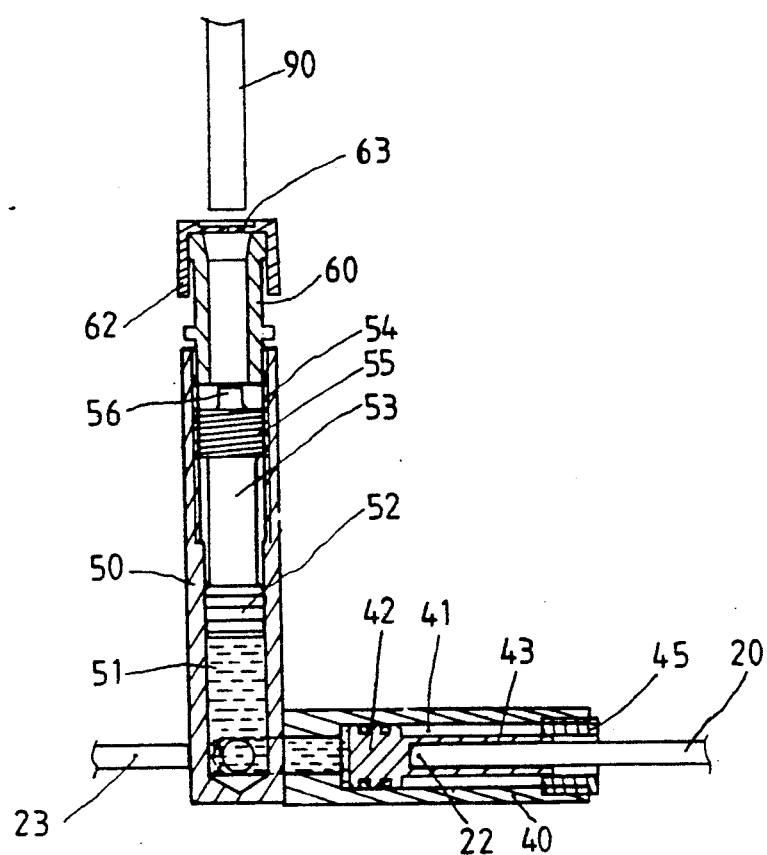
FIGS. 4 and 5 are cross sectional views of the expanding device.

Referring next to FIGS. 3 and 4, the expanding device 30 includes two tubes 40, 50 having a first end integrally formed together and perpendicular with each other. A bore 41, 51 is formed in each of the tubes 40, 50 for receiving hydraulic oil and the bores 41, 51 are communicated with each other. A piston 42, 52 is slidably received in each of the bores 41, 51 and integrally coupled to a first end of a rod 43, 53 respectively. A hole 44 is formed in the second end of the first rod 43 for receiving a first end 22 of the ring 20. The second end 23 of the ring 20 is engaged on the second end of the first tube 40. A nut 45 is threadedly engaged in the second end of the first tube 40 for limiting the movement of the piston 42.

An inner thread 54 is formed in the second end portion of the second tube 50. A head 55 with an outer thread formed thereon is integrally formed on the second end of the second rod 53 and is threadedly engaged with the inner thread 54 of the second tube 50 so that rotation of the head 55 causes the piston 52 to move within the bore 51 of the tube 50 and so that the hydraulic oil contained within the bores 41, 51 of the tubes 40, 50 can be pressurized by the piston 52. A bulge 56 is integrally formed on the second end of the rod 53 and can be engaged in a socket of a tool 90, such as a wrench, so that the rod 53 can be caused to rotate by the tool 90. An extension 60 is engaged on the second end of the tube 50. A dust cap 62 of rubber materials includes a plurality of blades 63 and is engaged on the free end of the extension 60. The extension 60 extends outward of the wheel cover through the opening 11 so that the tool 90 can be inserted into the extension 60.

Figure 5:
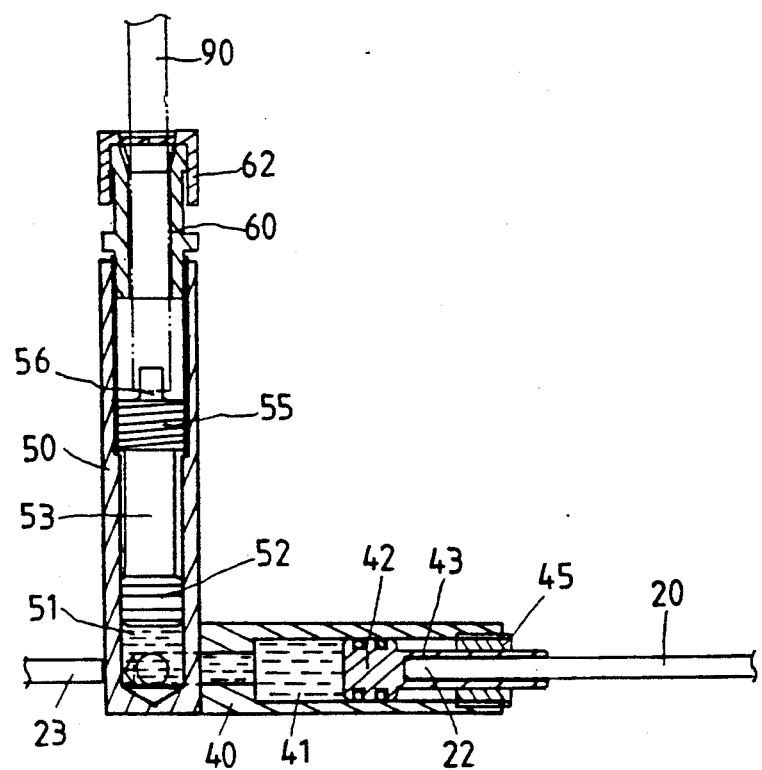
Figure 6:
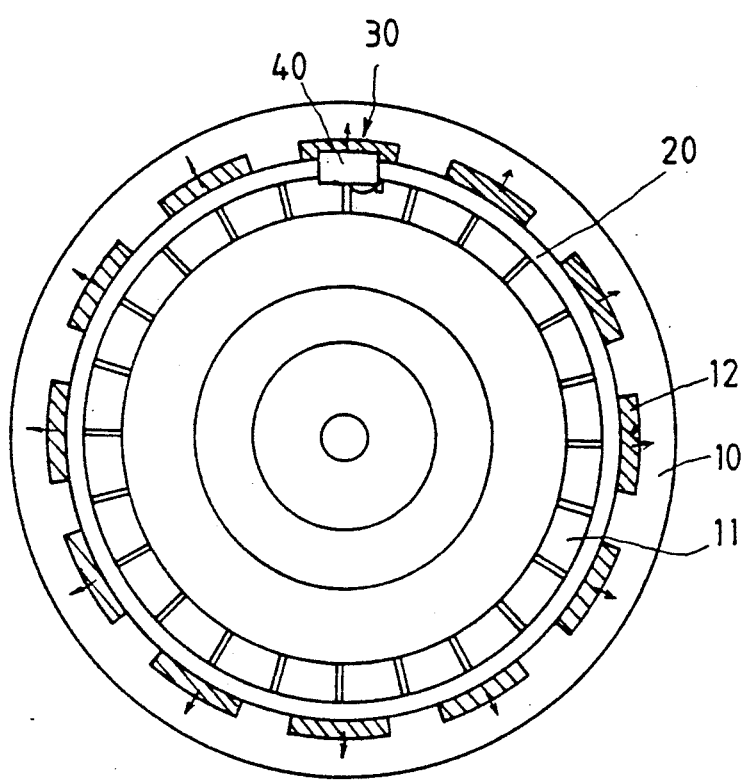
FIG. 6 is a bottom view of the wheel cover illustrating the operation of the expanding device.

In operation, referring next to FIGS. 5 and 6, the tool 90 may insert through the dust cap 62 and the extension 60 and may engage with the bulge 56 so that the rod 53 can be caused to rotate. When the rod 53 is rotated into the tube 50, the hydraulic oil is pressurized so that the piston 42 is caused to move outward of the tube 40 and so that the ring 20 can be expanded, and in turn, the fins 12 are caused to be expanded outward of the body 10 (FIG. 6). When the rod 53 is rotated in a reverse direction, the resilience of the ring 20 biases the piston 42 inwards of the tube 40 so that the fins 12 move inwards of the body 10 and so that the wheel cover can be easily clamped onto a wheel (not shown).

In order to remove the wheel cover, it is only required to rotate the rod 53 inwards of the tube 50 again, the fins 12 can be expanded so that the wheel cover can be easily removed.

Accordingly, the wheel cover in accordance with the present invention can be easily attached to a wheel and can be easily removed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheel cover comprising a body having a plurality of fins extended axially from a peripheral portion thereof, slot being formed in a free end portion of each of said fins, a ring engaged in said slots of said fins, a notch being formed in said ring so that said ring has a first end and a second end, and an expanding device including two tubes each having first ends which are integrally formed together, a bore being formed in each of said tubes for containing hydraulic oil, said bores being communicated with each other, second ends of each of said tubes being open, a piston being slidably received in each of said bores, said first end of said ring being engaged with said piston of said first tube, said second end of said ring being engaged with said second end of said first tube, an inner thread being formed in said second end of a second tube, a head being integrally coupled to said piston of said second tube and having an outer thread formed thereon for threaded engagement with said inner thread of said second tube, whereby said piston of said second tube can be caused to move into said second tube when said head rotates in one direction so that said piston of said first tube can be urged to move outward of said first tube and so that said ring can be expanded and so that said fins can be expanded, and said piston of said first tube can be pushed inward of said first tube by said ring when said head is rotated in a reverse direction.

2. A wheel cover according to claim 1, wherein a rod is integrally coupled to each of said pistons, a nut is threadedly engaged in said second end of said first tube for limiting movement of said piston of said first tube, said first end of said ring is engaged in said rod of said first tube, and said head and said piston of said second tube are integrally formed on the ends of said rod of said second tube, and a bulge is formed on an outer portion of said head and is engageable with a tool so that said head can be rotated by said tool.

3. A wheel cover according to claim 2, wherein a dust cap is disposed on said second end of said second tube and includes at least three blades, said blades are provided for closing said opened second end of said second tube, said tool passes through said blades of said dust cap before said tool can be inserted into said second tube.

4. A wheel cover according to claim 3, wherein a plurality of openings are formed in said body, an extension is engaged on said second end of said second tube and extends through one of said openings of said body, and said dust cap is engaged on a free end of said extension.

* * * * *